UNITED STATES PATENT OFFICE.

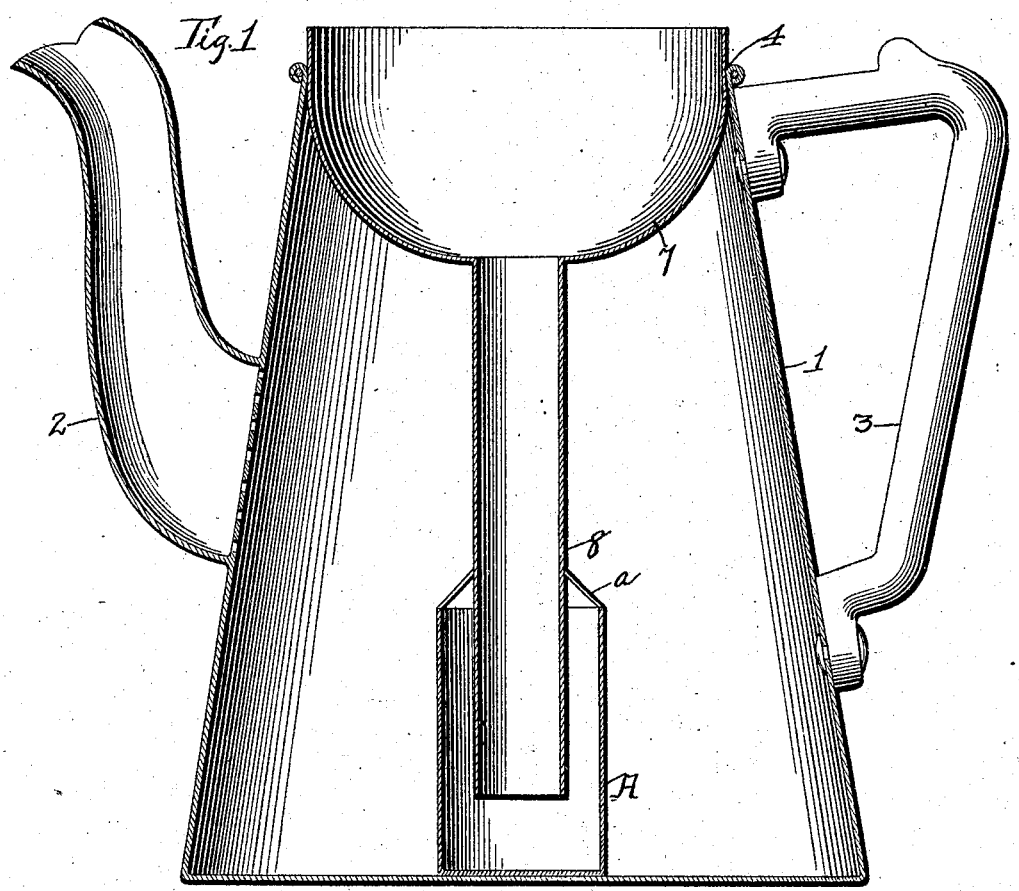
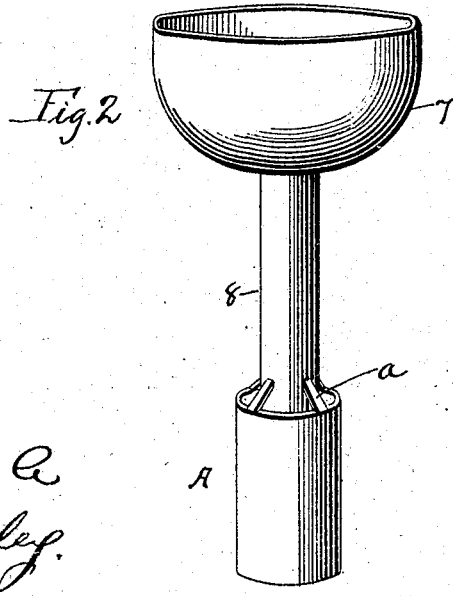

WILBUR S. DAY, OF WARREN, MINNESOTA.

TEA-KETTLE.

No. 806,243.  Specification of Letters Patent.  Patented Dec. 5, 1905.

Application filed May 2, 1904. Serial No. 206,017.

*To all whom it may concern:*

Be it known that I, WILBUR S. DAY, a citizen of the United States of America, residing at Warren, in the county of Marshall and State of Minnesota, have invented certain new and useful Improvements in Tea-Kettles, of which the following is a specification.

This invention relates to domestic boilers, and particularly to a class thereunder known as "tea-kettles," this invention relating particularly to a cover for preventing the escape of steam when the contents of a vessel is discharging from the spout thereof.

An object of this invention is to provide novel means consisting of a cover with a depending portion reaching into and sealed by the contents of the kettle, whereby the discharge of steam through the top opening of said kettle is prevented, a further object of this invention being to produce a cover for a kettle of this character which can be used as a funnel when detached from the tea-kettle.

With the foregoing and other objects in view the invention consists in the details of construction and in the arrangement and combination of parts to be hereinafter more fully set forth and specifically claimed.

In describing the invention in detail reference will be had to the accompanying drawings, forming part of this specification, wherein like characters denote corresponding parts throughout both views, in which—

Figure 1 is a sectional view of a tea-kettle with the cover embodying the invention applied thereto. Fig. 2 is a perspective view of the combined cover and funnel.

In the drawings, 1 indicates the tea-kettle, having the usual spout 2, bail 3, and opening 4 in its top for the reception of water and the like.

Fitting within the opening 4 and binding against the edge thereof is the body 7 of a funnel having a depending tube 8. The body 7 is preferably bowl-shaped, with the walls slightly flared toward the top in order that it may be pressed into engagement with the edge of the opening to effect a tight joint and to prevent the escape of steam.

To prevent the escape of steam through the tube 8, a trap A is applied to the free or lower end of the tube 8. This trap rests on the bottom of the kettle and has formed on its upper edge the resilient arms *a*, which engage the tube 8 and retain the trap A in its operative relation to the free end of the tube 8 no matter what position the kettle may attain. Having the trap engaging the tube in this manner permits the trap to be easily removed, so that the funnel may be used independently of the trap, thus making a combined device which will have many uses in the household.

In practice it is to be understood that the trap A is filled by the liquid poured into the kettle, and thereby forming a perfect seal for the tube. It is also to be observed that the arms *a* are so arranged that the tube 8 is centrally of the trap, said tube of course depending within the trap.

Having fully described the invention, what I claim as new, and desire to secure by Letters Patent, is—

A receptacle having an opening in its top, a cover for the opening comprising a body portion tightly fitting in the opening and having a depending tube-like portion, a trap resting on the bottom of the receptacle, the tube of the cover depending partly therein centrally thereof, and arms formed on the upper edge of the trap having their free ends binding against the tube, whereby the said trap is held at all times in its relation to the tube.

In testimony whereof I affix my signature, in the presence of two witnesses, this 14th day of April, 1904.

WILBUR S. DAY.

Witnesses:
 WM. J. BROWN,
 HOWARD E. DADY.